(12) United States Patent
Haessig et al.

(10) Patent No.: US 12,523,386 B2
(45) Date of Patent: Jan. 13, 2026

(54) AUTOMATED ADJUSTMENT HVAC MOTOR CONTROLLER CALL INTERFACE AND METHODS AND APPARATUS FOR SAME

(71) Applicant: Evolution Controls, Inc., Poway, CA (US)

(72) Inventors: David Lee Haessig, Poway, CA (US); Ronald Sai Kit Yip, Poway, CA (US); Roger Hort, Poway, CA (US)

(73) Assignee: Evolution Controls, Inc., Poway, CA (US)

( * ) Notice: Subject to any disclaimer, the term of this patent is extended or adjusted under 35 U.S.C. 154(b) by 210 days.

(21) Appl. No.: 17/382,626

(22) Filed: Jul. 22, 2021

(65) Prior Publication Data

US 2022/0026094 A1 Jan. 27, 2022

Related U.S. Application Data

(60) Provisional application No. 63/056,991, filed on Jul. 27, 2020.

(51) Int. Cl.
*F24F 11/64* (2018.01)
*F24F 11/77* (2018.01)

(52) U.S. Cl.
CPC .............. *F24F 11/64* (2018.01); *F24F 11/77* (2018.01)

(58) Field of Classification Search
CPC .. F24F 11/64; F24F 11/77; F24F 11/65; F24F 11/62; F24F 11/63; F24F 11/89; F24F 11/88; Y02B 30/70
See application file for complete search history.

(56) References Cited

U.S. PATENT DOCUMENTS

| | | | |
|---|---|---|---|
| 2011/0181216 A1* | 7/2011 | Bass | H02P 6/28 318/400.11 |
| 2019/0353381 A1* | 11/2019 | Atchison | F24F 11/59 |
| 2020/0319612 A1* | 10/2020 | Reed | G05B 19/042 |

* cited by examiner

*Primary Examiner* — Edelmira Bosques
*Assistant Examiner* — Brett Peterson Mallon
(74) *Attorney, Agent, or Firm* — Weintraub Tobin; Jo Carothers

(57) ABSTRACT

A method and apparatus for a controller and multi-speed interface ("MSI") in a heating, ventilating, and air-conditioning ("HVAC") systems to set each call by loading an adjustment profile into the controller. This controller, interface, and process is faster and more accurate than making manual adjustments and allows an equipment manufacturer or HVAC system installer to set many HVAC devices such as variable speed motors to exactly the same control signal value.

20 Claims, 7 Drawing Sheets

| Digital Adjustment Profile *200* | |
|---|---|
| Flags | |
| Call 0 Local | Set by process to enable Call 0 local adjust |
| Call 1 Local | Set by process to enable Call 1 local adjust |
| Call 2 Local | Set by process to enable Call 2 local adjust |
| Call 3 Local | Set by process to enable Call 3 local adjust |
| Call 4 Local | Set by process to enable Call 4 local adjust |
| | |
| Call 0 Inhibit Local | Profile sets flag to prohibit Call 0 local adjust |
| Call 1 Inhibit Local | Profile sets flag to prohibit Call 1 local adjust |
| Call 2 Inhibit Local | Profile sets flag to prohibit Call 2 local adjust |
| Call 3 Inhibit Local | Profile sets flag to prohibit Call 3 local adjust |
| Call 4 Inhibit Local | Profile sets flag to prohibit Call 4 local adjust |
| Registers | |
| Call 0 | Output value used when Call 0 local is not set |
| Call 1 | Output value used when Call 1 local is not set |
| Call 2 | Output value used when Call 2 local is not set |
| Call 3 | Output value used when Call 3 local is not set |
| Call 4 | Output value used when Call 4 local is not set |
| | |
| Analog Assign | A value between 0 and 4 indicating the call using an analog input in place of the local adjust. Any other value in the register disables the analog function. |

*FIG. 2*

AUTOMATED ADJUSTMENT HVAC MOTOR CONTROLLER CALL INTERFACE AND METHODS AND APPARATUS FOR SAME

CROSS-REFERENCE TO RELATED APPLICATIONS

This application claims priority under 35 U.S.C. Section 119(e) to U.S. Provisional Patent Application No. 63/056,991, filed on Jul. 27, 2020, the entire disclosure of which is incorporated herein by reference.

FIELD OF THE INVENTION

The present invention relates generally to controllers and controller call interfaces for motors and other devices in heating, ventilating, and air-conditioning ("HVAC") systems.

BACKGROUND OF THE INVENTION

HVAC thermostats or other control devices connect to a controlled HVAC machine using a low voltage multi-conductor cable. One conductor carries twenty-four Volts alternating current ("24 Volts AC") to the thermostat, and the thermostat connects 24 Volts AC to the other conductors to signal the HVAC machine that the thermostat needs heat, fan, cool, and other functions the HVAC machine can perform. In the HVAC industry, these signals are commonly referred to as "calls."

Calls also control the blower motor speed because the required blower motor speed is often different for each call. For example, a call for heat may require a lower blower motor speed than a call for cooling.

A controller such as a Multi-Speed Interface ("MSI") motor controller monitors calls from an HVAC thermostat, switch, or other control device, then outputs an associated adjustable control signal or motor control signal (sometimes referred to as "MCS") value that proportionately controls an HVAC blower, pump, motor, actuator, or other HVAC system device.

An adjustment associated with each call sets the corresponding control signal to the desired value. The adjustment range for the control signal associated with each call corresponds to an MCS value that is from zero percent (or "off") to one-hundred percent ("100%") of the control range of the controlled motor or HVAC device. An additional adjustment, which may be referred to as "Call 0" sets the control signal when no call is present.

A plurality of wires from the thermostat or other control device are connected to a plurality of call connections on the controller. When the thermostat energizes one of the wires with 24 Volts AC, the thermostat is calling for, or requesting, the controller to output the associated MCS value to the connected HVAC device such as for example a variable speed motor (sometimes referred to as a "VS Motor").

However, currently the MCS value for each call must be set using a manual adjustment on the controller that is associated with each call. Thus, these existing products are tedious and time consuming to accurately adjust using the manual adjustments on the controller, especially during initial factory or field installation setup. Therefore, an improved controller and interface is desired to overcome these current limitations and difficulties.

BRIEF SUMMARY OF THE INVENTION

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

According to various embodiments, the present invention uses a digital device such as a laptop computer or similar computing device to load a digital adjustment profile (sometime referred to as "DAP") into the controller while maintaining all the functionality and behavior of the controller.

In one embodiment, the controller comprises a microcontroller with non-volatile memory to store the digital adjustment profile, an analog input to receive an analog signal from an external HVAC control device such as a thermostat, a digital device connection to load the digital adjustment profile from an external source such as a laptop or similar computing device, an analog output to connect to the VS Motor or other external controlled HVAC component, a 24 Volts AC power connection, manual control signal adjusters, and four call connections. However, in alternative embodiments more or fewer call connections may be used. In another alternative embodiment, non-volatile memory could be interfaced or connected to microcontroller instead of being integrated with microcontroller.

The disclosed invention provides an interface and technique to set the value associated with each call by loading the digital adjustment profile into the controller. This process is faster and more accurate than making manual adjustments and allows an equipment manufacturer or HVAC system installer to set many HVAC devices to the same control signal values. This improved controller uses a profile to set all adjustments in one step and adds additional features, instead of individually setting each adjustment on each controller.

In one embodiment, using the disclosed invention, equipment manufacturers can pre-configure the motor control signal and corresponding values in the controller without using the local adjustments. Equipment manufacturers can also enable or disable each local adjustment. When a local adjustment is disabled, the corresponding adjustor cannot be used to manually adjust the selected call, and the control signal value set by the digital adjustment profile is used. When a local adjustment is enabled, the corresponding adjustor can be used to manually adjust the control signal values for the selected call, overriding the control signal values set by the digital adjustment profile.

In another embodiment, a digital device is used to load a digital adjustment profile into the MSI while maintaining all the functionality and behavior of the MSI. This process is faster and more accurate than making manual adjustments and allows an equipment manufacturer or HVAC system installer to efficiently set many HVAC motors to exactly the same MCS values without having to manually adjust each one, and it would be very difficult to get all HVAC motors to exactly the same MCS values if adjusted manually.

In a further embodiment, the digital adjustment profile may be loaded into the MSI by connecting a digital device to the MSI. In a further embodiment, the digital adjustment profile includes an MCS value for each call.

In a further embodiment, a control signal value that was set by the digital adjustment profile may be overwritten by operating the manual adjuster for the call. In a further embodiment, the digital adjustment profile defines the control signal value of each call, where the control signal value may be overwritten by operating the manual adjuster for the call or locked to the control signal value set by the digital adjustment profile.

In a further embodiment, the digital adjustment profile may be reinstated by placing a jumper on the controller when values have been overwritten by operating the manual adjustment for the call. In a further embodiment, an analog input or inputs can be used to set a called control signal value.

Other objects, features, and advantages of the present invention will become apparent upon consideration of the following detailed description and the accompanying drawings.

BRIEF DESCRIPTION OF THE DRAWINGS

FIG. 2 is a table of an example embodiment of the invention consisting of an example digital adjustment profile.

DETAILED DESCRIPTION OF THE INVENTION

The following is a detailed description of embodiments to illustrate the principles of the invention. The embodiments are provided to illustrate aspects of the invention, but the invention is not limited to any embodiment. The scope of the invention encompasses numerous alternatives, modifications, and equivalents. The scope of the invention is limited only by the claims.

While numerous specific details are set forth in the following description to provide a thorough understanding of the invention, the invention may be practiced according to the claims without some or all of these specific details.

Various embodiments will be described in detail with reference to the accompanying drawings. Wherever possible, the same reference numbers are used throughout the drawings to refer to the same or like parts. References made to particular examples and implementations are for illustrative purposes and are not intended to limit the scope of the claims.

Controller 100

Figure 1:
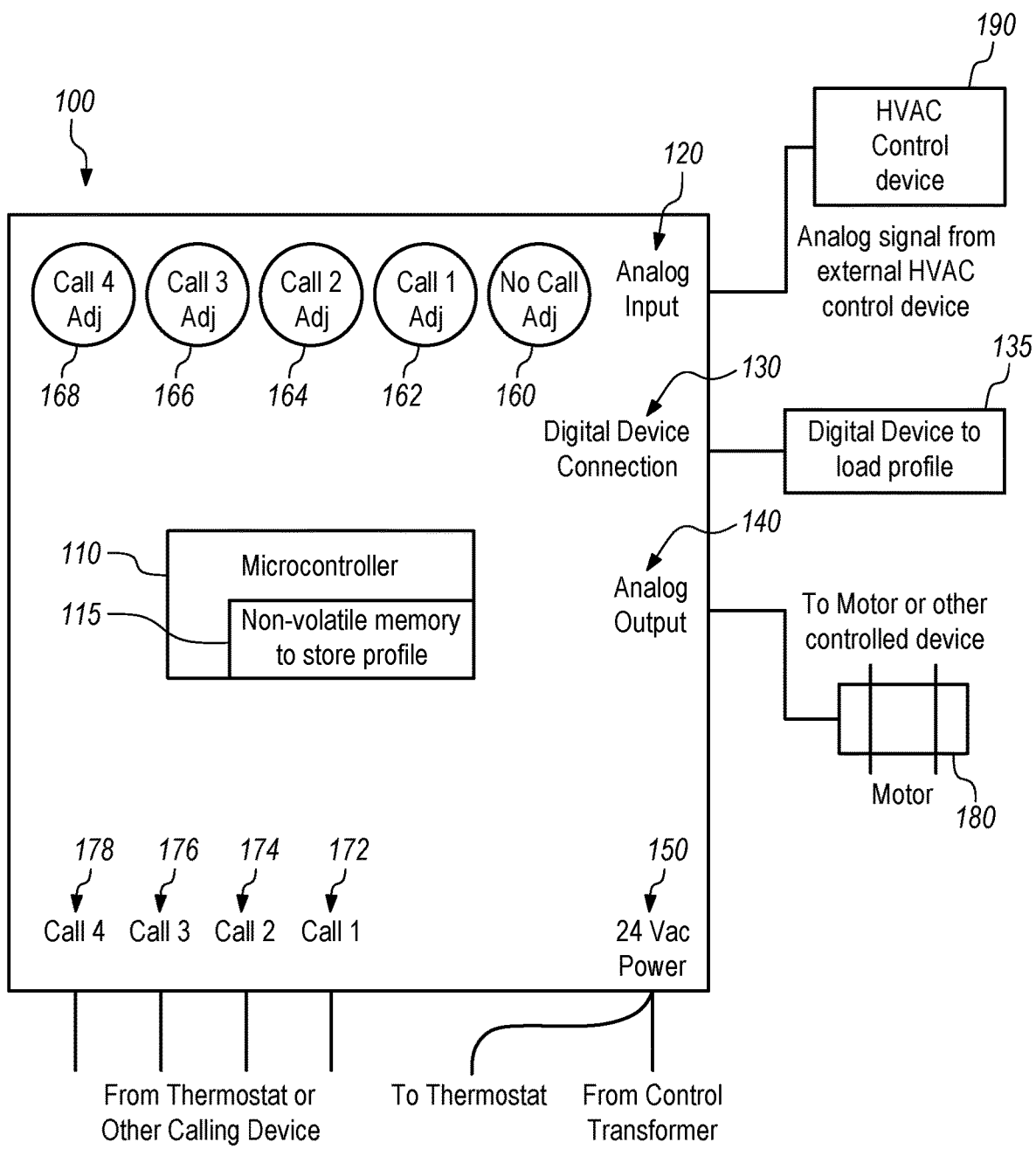
FIG. 1 illustrates an example embodiment of the invention consisting of a diagram of an example controller.

FIG. 1 illustrates an example embodiment of a diagram of controller 100, such as in one embodiment an MSI motor controller. Controller 100 comprises a microcontroller 110 with non-volatile memory 115 to store a digital adjustment profile 200 (see FIG. 2), an analog input 120 to receive an analog signal with an analog input value from an external HVAC control device 190 such as a thermostat, a digital device connection 130 to load digital adjustment profile 200 from external source 135 such as a laptop or similar computing device, an analog output 140 to connect to external controlled HVAC device 180 such as a variable speed (VS) motor, power connection 150 such as a 24 Volts AC power connection, manual control signal adjusters 160, 162, 164, 166, and 168, call connection 172 for Call 1, call connection 174 for Call 2, call connection 176 for Call 3, and call connection 178 for Call 4. However, in alternative embodiments more or fewer connections and calls may be used. In another alternative embodiment, non-volatile memory 115 could be interfaced or connected to microcontroller 110 instead of being integrated with microcontroller 110.

Digital Adjustment Profile 200

FIG. 2 provides a table of an example digital adjustment profile 200 including flags Call 0 Local, Call 1 Local, Call 2 Local, Call 3 Local, Call 4 Local, Call 0 Inhibit Local, Call 1 Inhibit Local, Call 2 Inhibit Local, Call 3 Inhibit Local, and Call 4 Inhibit Local. FIG. 2 also shows Registers Call 0, Call 1, Call 2, Call 3, and Call 4. Local Call is used to enable local or manual adjust. Inhibit Local Call is used to disable the local or manual adjust.

Each of the calls is associated with an adjustable control signal value, such as a motor control signal (MCS) value, for example from Off (or zero percent) to fully On (or one-hundred percent) of the control range of the controlled HVAC device 180 such as a variable speed motor. Any values between zero to one-hundred percent, such as for example 20%, 40%, 60%, or 80% of the control range, may also be used for the adjustable control signal value. Further, the analog input value can be used in place of the adjustable control signal value, when signaled by the external HVAC control device 190.

Controller Process 1000

Figure 3:
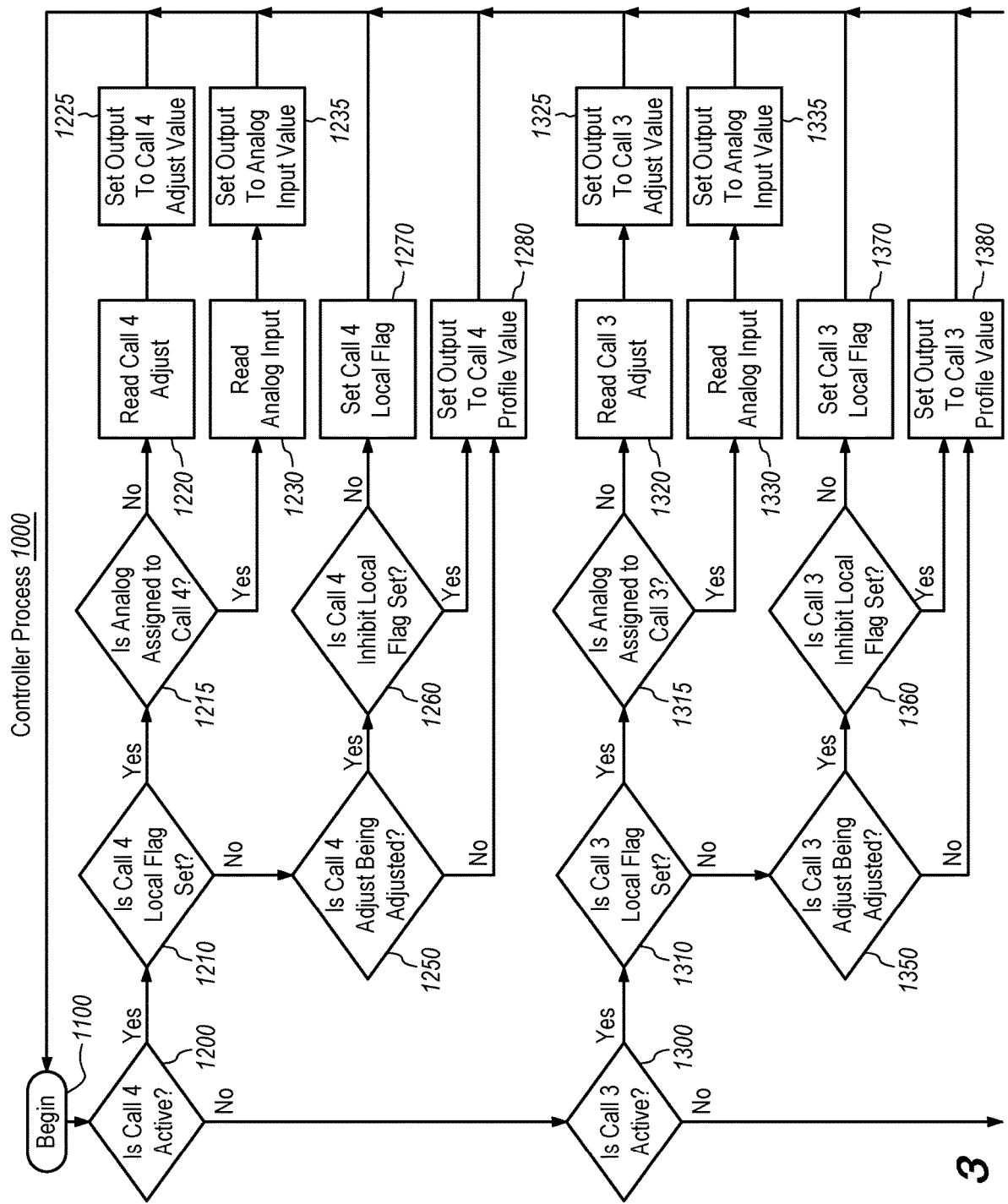
FIG. 3 illustrates an example embodiment of the invention consisting of a flow diagram for an example controller process.
Figure 3:
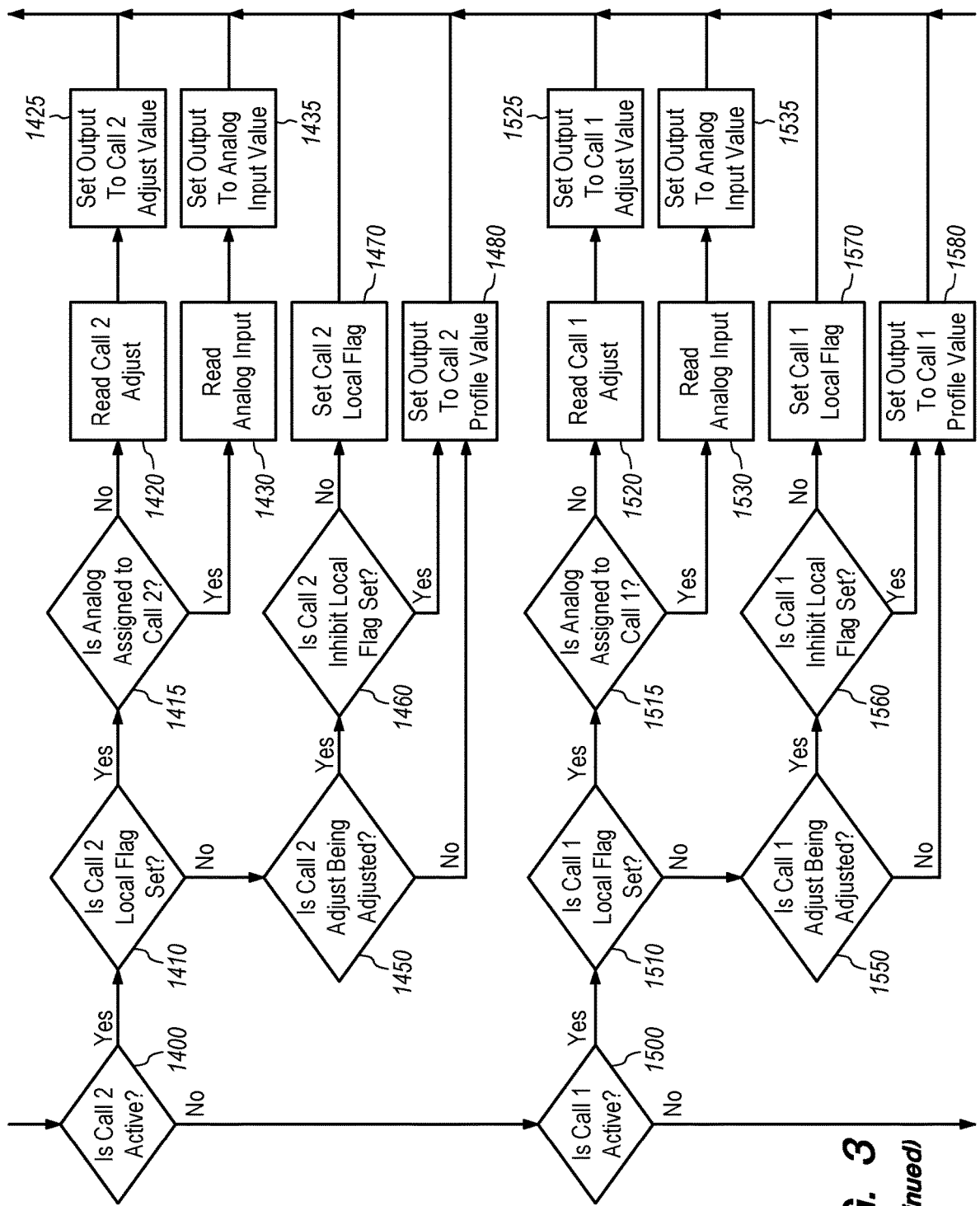
Figure 3:
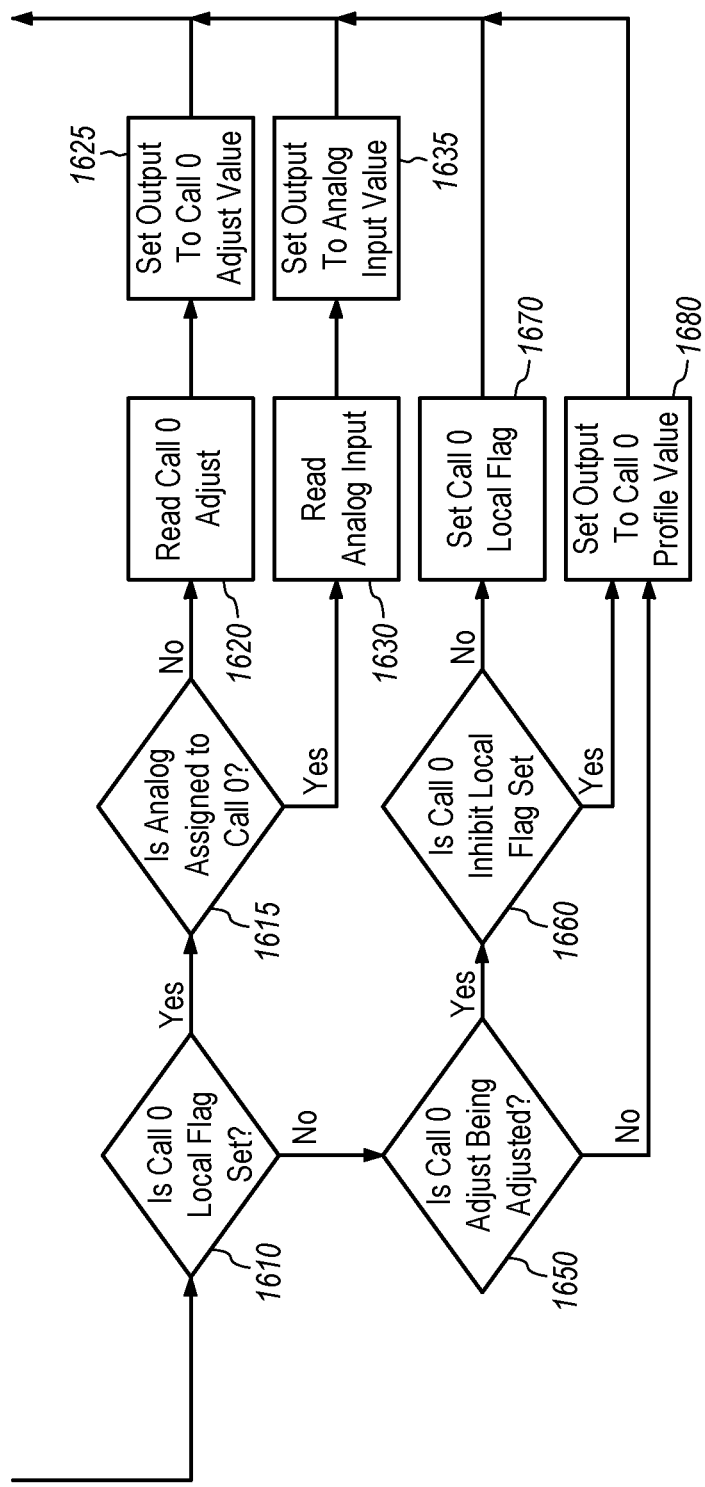

FIG. 3 illustrates an example embodiment of a flow diagram for controller process 1000 for controller 100 using digital adjustment profile 200 for a controlled HVAC device 180 such as a VS motor.

At step 1100, controller process 1000 for controller 100 using digital adjustment profile 200 begins. At step 1200, controller process 1000 checks if Call 4 at connection 178 from the calling external HVAC control device 190 such as a thermostat is activated by 24 Volts AC or not active at 0 Volts. If it is not active, controller process 1000 moves to step 1300 below. If it is active at step 1200, controller process 1000 moves to step 1210 where it checks whether the Call 4 DAP Local flag is set to enable Call 4 local adjust. If it is set, controller process 1000 then moves to step 1215, where it checks whether there is an analog with a 0-10 Volt input for 0-100% output assigned to Call 4.

An analog is assigned when a DAP Analog Assign register value in the range of 0 to 4 equals the call number indicating the call should use the analog input value in place of the local adjust value. If the register value is not 4, controller process 1000 moves to step 1220 to read the Call 4 adjust value, then to step 1225 to set the output to the Call 4 adjust value, and then returns to begin step 1100.

Turning back to step 1210, if the Call 4 local flag is not set, then step 1250 checks if the Call 4 adjust value is changing, indicating that an attempt to adjust Call 4 is occurring. If Call 4 adjust is being adjusted, then step 1260 checks if the DAP Inhibit Local Flag 4 is clear. If clear, step 1270 Sets the DAP Local Flag enabling local adjustment and returns to begin step 1100, and Local adjustment occurs on the next pass thru controller process 1000.

Turning back to step 1260, if the Call 4 DAP Flag Inhibit Local Flag 4 is set, controller process 1000 moves to step 1280 where the output is set to the DAP Register Call 4 value, then returns to begin step 1100. Turning back to step 1250, if Call 4 adjust is not being adjusted, controller process 1000 moves to step 1280 where the output is set to the DAP Register Call 4 value, then returns to begin step 1100.

Turning back to step 1100, if step 1200 is not active, controller process 1000 moves to step 1300. At step 1300, controller process 1000 checks if Call 3 at connection 176 from the calling external HVAC control device 190 is activated by 24 Volts AC or not active at 0 Volts. If it is not active, controller process 1000 moves to step 1400 below. If it is active at step 1300, controller process 1000 moves to step 1310 where it checks whether the Call 3 DAP Local flag is set to enable Call 3 local adjust. If it is set, controller process 1000 then moves to step 1315, where it checks whether there is an analog with a 0-10 Volt input for 0-100% output assigned to Call 3.

An analog is assigned when a DAP Analog Assign register value in the range of 0 to 4 equals the call number indicating the call should use the analog input value in place of the local adjust. If the register value is not 3, controller process 1000 moves to step 1320 to read the Call 3 adjust value, then to step 1325 to set the output to the Call 3 adjust value, and then returns to begin step 1100.

Turning back to step 1310, if the Call 3 local flag is not set, then step 1350 checks if the Call 3 adjust value is changing, indicating that an attempt to adjust Call 3 is occurring. If Call 3 adjust is being adjusted, then step 1360 checks if the DAP Inhibit Local Flag 3 is clear. If clear, step 1370 Sets the DAP Local Flag enabling local adjustment and returns to begin step 1100, and Local adjustment occurs on the next pass thru the program loop.

Turning back to step 1360, if the Call 3 DAP Flag Inhibit Local Flag 4 is set, controller process 1000 moves to step 1380 where the output is set to the DAP Register Call 3 value, then returns to begin step 1100. Turning back to step 1350, if Call 3 adjust is not being adjusted, controller process 1000 moves to step 1380 where the output is set to the DAP Register Call 3 value, then returns to begin step 1100.

Turning back to step 1100, if step 1200 or 1300 is not active, controller process 1000 moves to step 1400. At step 1400, the process checks if Call 2 at connection 174 from the calling external HVAC control device 190 is activated by 24 Volts AC or not active at 0 Volts. If it is not active, controller process 1000 moves to step 1500 below. If it is active at step 1400, controller process 1000 moves to step 1410 where it checks whether the Call 2 DAP Local flag is set to enable Call 2 local adjust. If it is set, controller process 1000 then moves to step 1415, where it checks whether there is an analog with a 0-10 Volt input for 0-100% output assigned to Call 2.

An analog is assigned when a DAP Analog Assign register value in the range of 0 to 4 equals the call number indicating the call should use the analog input value in place of the local adjust. If the register value is not 2, controller process 1000 moves to step 1420 to read the Call 2 adjust value, then to step 1425 to set the output to the Call 2 adjust value, and then returns to begin step 1100.

Turning back to step 1410, if the Call 2 local flag is not set, then step 1450 checks if the Call 2 adjust value is changing, indicating that an attempt to adjust Call 2 is occurring. If Call 2 adjust is being adjusted, then step 1460 checks if the DAP Inhibit Local Flag 2 is clear. If clear, step 1470 Sets the DAP Local Flag enabling local adjustment and returns to begin step 1100, and Local adjustment occurs on the next pass thru the program loop.

Turning back to step 1460, if the Call 2 DAP Flag Inhibit Local Flag 2 is set, controller process 1000 moves to step 1480 where the output is set to the DAP Register Call 2 value, then returns to begin step 1100. Turning back to step 1450, if Call 2 adjust is not being adjusted, controller process 1000 moves to step 1480 where the output is set to the DAP Register Call 2 value, then returns to begin step 1100.

Turning back to step 1100, if step 1200, 1300 or 1400 is not active, controller process 1000 moves to step 1500. At step 1500, the process checks if Call 1 at connection 172 from the calling external HVAC control device 190 is activated by 24 Volts AC or not active at 0 Volts. If it is not active, controller process 1000 moves to step 1610 below. If it is active at step 1500, controller process 1000 moves to step 1510 where it checks whether the Call 1 DAP Local flag is set to enable Call 1 local adjust. If it is set, controller process 1000 then moves to step 1515, where it checks whether there is an analog with a 0-10 Volt input for 0-100% output assigned to Call 1.

An analog is assigned when a DAP Analog Assign register value in the range of 0 to 4 equals the call number indicating the call should use the analog input value in place of the local adjust. If the register value is not 1, controller process 1000 moves to step 1520 to read the Call 1 adjust value, then to step 1525 to set the output to the Call 1 adjust value, and then returns to begin step 1100.

Turning back to step 1510, if the Call 1 local flag is not set, then step 1550 checks if the Call 1 adjust value is changing, indicating that an attempt to adjust Call 1 is occurring. If Call 1 adjust is being adjusted, then step 1560 checks if the DAP Inhibit Local Flag 1 is clear. If clear, step 1570 Sets the DAP Local Flag enabling local adjustment and returns to begin step 1100, and Local adjustment occurs on the next pass thru the program loop.

Turning back to step 1560, if the Call 1 DAP Flag Inhibit Local Flag 1 is set, controller process 1000 moves to step 1580 where the output is set to the DAP Register Call 1 value, then returns to begin step 1100. Turning back to step 1550, if Call 1 adjust is not being adjusted, controller process 1000 moves to step 1580 where the output is set to the DAP Register Call 1 value, then returns to begin step 1100.

Turning back to step 1100, if step 1200, 1300, 1400 or 1500 is not active, controller process 1000 moves to step 1610. At step 1610, controller process 1000 checks whether the Call 0 DAP Local flag is set to enable Call 0 local adjust. If it is set, controller process 1000 then moves to step 1615, where it checks whether there is an analog with a 0-10 Volt input for 0-100% output assigned to Call 0. An analog is assigned when a DAP Analog Assign register value in the range of 0 to 4 equals the call number indicating the call should use the analog input value in place of the local adjust. If the register value is not 0, controller process 1000 moves to step 1620 to read the Call 0 adjust value, then to step 1625 to set the output to the Call 0 adjust value, and then returns to begin step 1100.

Turning back to step 1610, if the Call 0 local flag is not set, then step 1650 checks if the Call 0 adjust value is changing, indicating that an attempt to adjust Call 0 is occurring. If Call 0 adjust is being adjusted, then step 1660 checks if the DAP Inhibit Local Flag 0 is clear. If clear, step 1670 Sets the DAP Local Flag enabling local adjustment and returns to begin step 1100, Local adjustment occurs on the next pass thru the program loop.

Turning back to step 1660, if the Call 0 DAP Flag Inhibit Local Flag 0 is set, controller process 1000 moves to step 1680 where the output is set to the DAP Register Call 0 value, then returns to begin step 1100. Turning back to step 1650, if Call 0 adjust is not being adjusted, controller process 1000 moves to step 1680 where the output is set to the DAP Register Call 0 value, then returns to begin step 1100.

Controller with Manual Adjustment Process 3000

Figure 4:
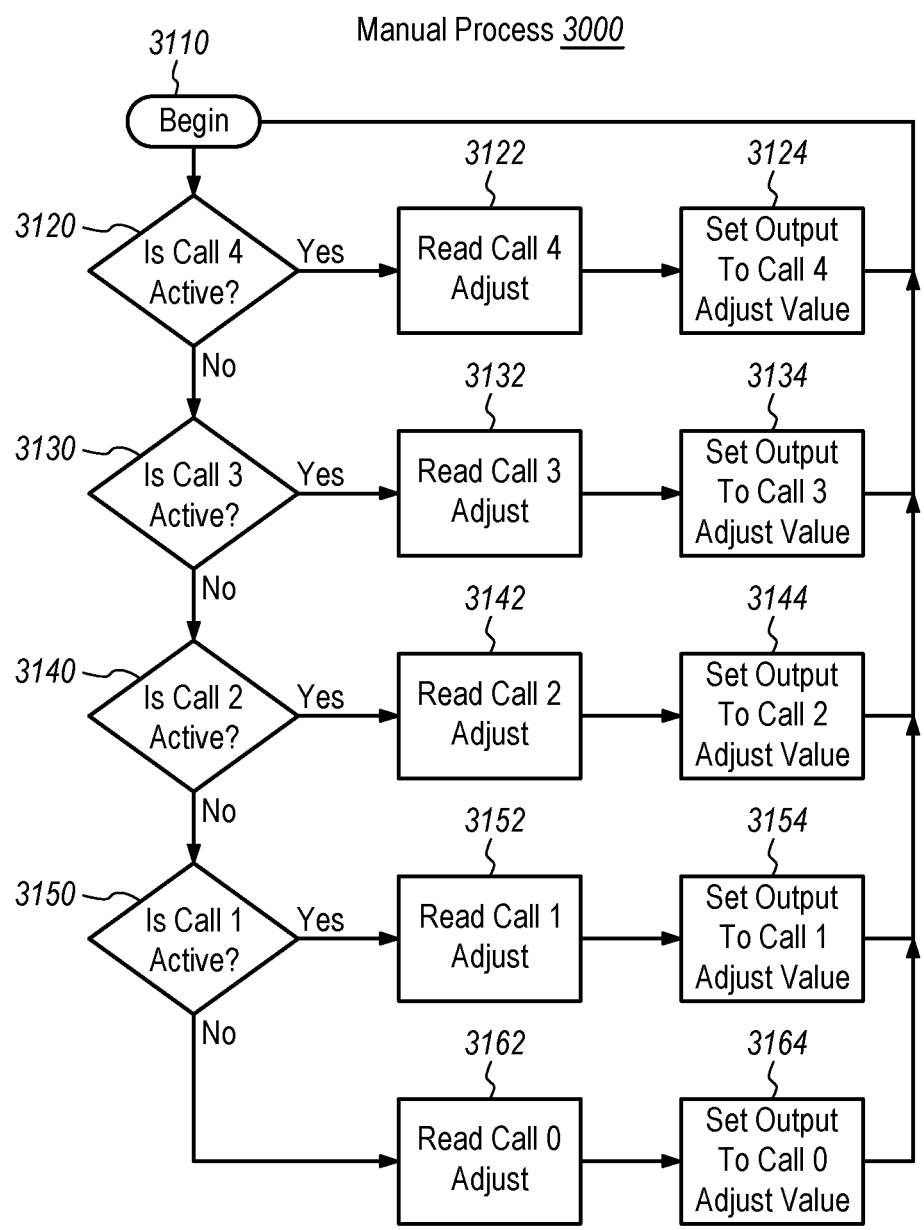
FIG. 4 illustrates an embodiment of the invention consisting of a flow diagram for an example manual adjustment process that can be used in conjunction with the controller process.

Turning to FIG. 4, an example embodiment of a flow diagram for a controller 100 with manual adjustment process 3000 using manual control signal adjusters 160, 162, 164, 166, and 168 of controller 100 is shown. In process 3000, the calls for controller 100 are initially set by digital adjustment profile 200, but further adjustments of each individual call can be done manually.

In one embodiment, local adjustment for manual adjustment process 3000 can be enabled or disabled. When a local adjustment with manual adjustment process 3000 is disabled, the corresponding manual control signal adjusters 160, 162, 164, 166, and 168 of controller 100 cannot be used to manually adjust the selected call, and the control signal value set by the digital adjustment profile 200 is used. When a local adjustment with manual adjustment process 3000 is enabled, the corresponding manual control signal adjusters 160, 162, 164, 166, and 168 can be used to manually adjust the control signal values for the selected call, overriding the control signal values set by the digital adjustment profile 200.

If local adjustment is enabled, at step 3110 manual adjustment process 3000 for controller 100 begins and then moves to step 3120 where manual adjustment process 3000 checks if Call 4 is active. If it is active, manual adjustment process 3000 moves to step 3122 where it reads the Call 4 adjust value, then to step 3124 where the output is set to the Call 4 adjust value, and then returns to begin step 3110.

If step 3120 is not active, manual adjustment process 3000 moves to step 3130 below where manual adjustment process 3000 checks if Call 3 is active. If it is active, manual adjustment process 3000 moves to step 3132 where it reads the Call 3 adjust value, then to step 3134 where the output is set to the Call 3 adjust value, and then returns to begin step 3110.

If step 3120 or 3130 is not active, manual adjustment process 3000 moves to step 3140 below where manual adjustment process 3000 checks if Call 2 is active. If it is active, manual adjustment process 3000 moves to step 3142 where it reads the Call 2 adjust value, then to step 3144 where the output is set to the Call 2 adjust value, and then returns to begin step 3110.

If step 3120, 3130 or 3140 is not active, manual adjustment process 3000 moves to step 3150 where manual adjustment process 3000 checks if Call 1 is active. If it is active, manual adjustment process 3000 moves to step 3152 where it reads the Call 1 adjust value, then to step 3154 where the output is set to the Call 1 adjust value, and then returns to begin step 3110.

If step 3120, 3130, 3140 or 3150 is not active, manual adjustment process 3000 moves to step 3162 where it reads the Call 0 adjust value, then to step 3164 where the output is set to the Call 0 adjust value, and then returns to begin step 3110.

Figure 5:
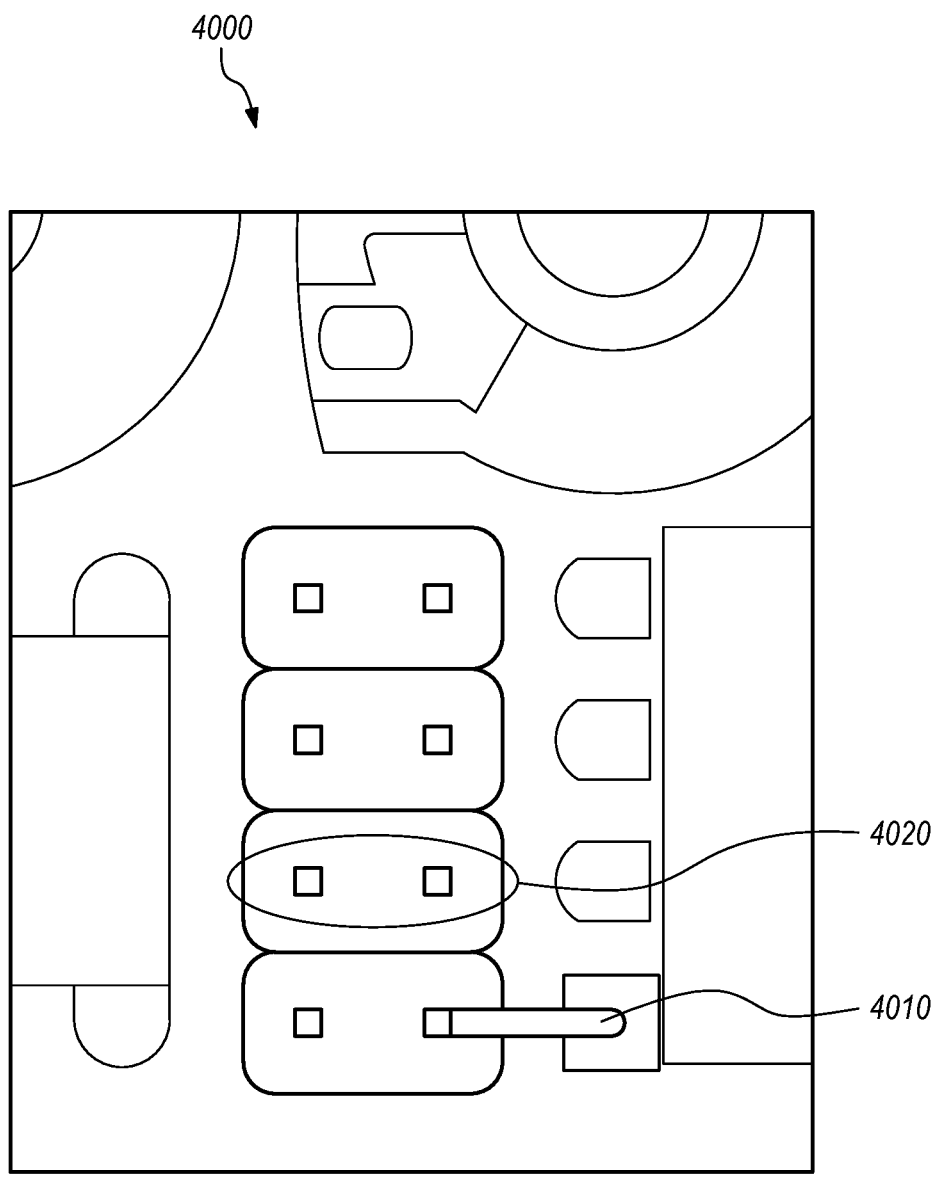
FIG. 5 illustrates an embodiment of the invention where the digital adjustment profile may be reinstated by placing a jumper on the controller when the control signal values have been overwritten by manual adjustment.

FIG. 5 illustrates an embodiment of the invention where the control signal values can be rest to the digital adjustment profile 200 after using manual adjustment process 3000 to adjust the control signal values by placing jumper 4010 on pins 4020 of controller 4000.

The disclosed embodiments are illustrative, not restrictive. While specific configurations have been described, it is understood that the present invention can be applied to a wide variety of applications. There are many alternative ways to implement the invention.

What is claimed is:

1. A controller in heating, ventilating, and air-conditioning (HVAC) systems comprising:
a power connection;
an analog output for connecting to a HVAC device;
an analog input for receiving an analog signal with an analog input value from a HVAC control device;
a plurality of call connections for connecting to the HVAC control device, wherein one of the plurality of call connections receives one of a plurality of calls from the HVAC control device;
a digital adjustment profile for initially setting a plurality of adjustable control signal values output to the HVAC device, wherein the digital adjustment profile comprises the plurality of adjustable control signal values, and wherein each one of the plurality of adjustable control signal values is associated with one of the plurality of calls from the HVAC control device;
an interface for transferring the digital adjustment profile from an external source;
a plurality of manual control signal adjusters for manually adjusting the plurality of adjustable control signal values initially set using the digital adjustment profile;
a non-volatile memory for storing the digital adjustment profile;
a microcontroller connected to the non-volatile memory;
wherein the microcontroller monitors the plurality of call connections for one of the plurality of calls from the HVAC control device and outputs one of the plurality of adjustable control signal values to the HVAC device;
wherein the one of the plurality of adjustable control signal values output to the HVAC device is capable of being manually adjusted by one of the manual control signal adjusters before being output to the HVAC device; and
wherein the plurality of manual control signal adjusters are capable of being disabled by an equipment manufacturer using the digital adjustment profile with no ability to reenable the plurality of manual control signal adjusters so that the plurality of adjustable control signal values output to the HVAC device is set to be the plurality of adjustable control signal values in the digital adjustment profile and cannot be manually adjusted by one of the manual control signal adjusters.

2. The controller of claim 1 wherein the one of the plurality of adjustable control signal values output to the HVAC device is adjusted by the one of the plurality of manual control signal adjusters.

3. The controller of claim 1 wherein the controller further comprises a jumper for resetting the plurality of adjustable control signal values to the digital adjustment profile stored on the non-volatile memory.

4. The controller of claim 1 wherein the HVAC control device is a thermostat.

5. The controller of claim 1 wherein the non-volatile memory is integrated with the microcontroller.

6. The controller of claim 1 wherein the HVAC device is a motor.

7. The controller of claim 6 wherein the motor is a variable speed motor.

8. The controller of claim 7 wherein the one of the plurality of adjustable control signal values output to the variable speed motor is for setting a speed of the variable speed motor.

9. The controller of claim 1 wherein the power connection comprises a 24 Volt power connection.

10. The controller of claim 1 wherein the plurality of call connections comprises four call connections.

11. The controller of claim 1 wherein the one of the plurality of adjustable control signal values output to the HVAC device is set by the analog input value from the HVAC control device.

12. A motor controller in heating, ventilating, and air-conditioning (HVAC) systems comprising:
a 24 Volt power connection;
an analog output for connecting to a motor;
an analog input for receiving an analog signal with an analog input value from a HVAC control device;
a plurality of call connections for connecting to the HVAC control device, wherein one of the plurality of call connections receives one of a plurality of calls from the HVAC control device;
a digital adjustment profile for initially setting a plurality of adjustable control signal values output to the HVAC device, wherein the digital adjustment profile comprises the plurality of adjustable control signal values, and wherein each one of the plurality of adjustable control signal values is associated with one of the plurality of calls from the HVAC control device;
an interface for transferring the digital adjustment profile from an external source;
a plurality of manual control signal adjusters for manually adjusting the plurality of adjustable control signal values initially set using the digital adjustment profile;
a non-volatile memory for storing the digital adjustment profile;
a microcontroller connected to the non-volatile memory;
wherein the microcontroller monitors the plurality of call connections for one of the plurality of calls from the HVAC control device and outputs one of the plurality of adjustable control signal values to the motor;
wherein the one of the plurality of adjustable control signal values output to the motor is capable of being manually adjusted by one of the manual control signal adjusters before being output to the motor; and
wherein the plurality of manual control signal adjusters are capable of being disabled by an equipment manufacturer using the digital adjustment profile with no ability to reenable the plurality of manual control signal adjusters so that the plurality of adjustable control signal values output to the HVAC device is set to be the plurality of adjustable control signal values in the digital adjustment profile and cannot be manually adjusted by one of the manual control signal adjusters.

13. The motor controller of claim 12 wherein the controller further comprises a jumper for resetting the plurality of adjustable control signal values to the digital adjustment profile stored on the non-volatile memory.

14. The controller of claim 12 wherein the plurality of call connections comprises four call connections.

15. The controller of claim 12 wherein the motor is a variable speed motor.

16. The controller of claim 15 wherein the one of the plurality of adjustable control signal values output to the variable speed motor is for setting a speed of the variable speed motor.

17. The controller of claim 12 wherein the one of the plurality of adjustable control signal values output to the motor is set by the analog input value from a HVAC control device.

18. The controller of claim 12 wherein the HVAC control device is a thermostat.

19. The controller of claim 12 wherein the one of the plurality of adjustable control signal values output to the motor is adjusted by the one of the plurality of manual control signal adjusters.

20. The controller of claim 12 wherein the non-volatile memory is integrated with the microcontroller.

* * * * *